(12) United States Patent
Schiller

(10) Patent No.: US 10,692,178 B2
(45) Date of Patent: Jun. 23, 2020

(54) SPATIAL RADIOMETRIC CORRECTION OF AN OPTICAL SYSTEM HAVING A COLOR FILTER MOSAIC

(71) Applicant: Raytheon Company, Waltham, MA (US)

(72) Inventor: Stephen J. Schiller, La Mirada, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 16/281,977

(22) Filed: Feb. 21, 2019

(65) Prior Publication Data

US 2019/0259135 A1 Aug. 22, 2019

Related U.S. Application Data

(60) Provisional application No. 62/633,861, filed on Feb. 22, 2018.

(51) Int. Cl.
*G06T 3/40* (2006.01)
*H04N 5/374* (2011.01)
*H04N 5/345* (2011.01)
*H04N 9/04* (2006.01)

(52) U.S. Cl.
CPC .......... *G06T 3/4015* (2013.01); *G06T 3/4007* (2013.01); *H04N 5/345* (2013.01);
(Continued)

(58) Field of Classification Search
CPC ....... G06T 3/4015; G06T 3/4007; G06T 7/80; G06T 2207/10024; H04N 5/374;
(Continued)

(56) References Cited

U.S. PATENT DOCUMENTS 6,366,694 B1 4/2002 Acharya
6,771,811 B1 8/2004 Walmsley et al.
(Continued)

OTHER PUBLICATIONS

Ramanath, Rajeev, et al., "Demosaicking methods for Bayer color arrays", Journal of Electronic Imaging vol. 11(3), (Jul. 2002), 306-315.
(Continued)

*Primary Examiner* — Abdelaaziz Tissire
(74) *Attorney, Agent, or Firm* — Schwegman Lundberg & Woessner, P.A.

(57) ABSTRACT

In an optical system, a color filter mosaic can determine first color pixel locations, second color pixel locations, and third color pixel locations in an array of sensor pixels. The optical system can capture overhead images, which can be subtracted to form a background-subtracted tri-color image of a reflection of sunlight from at least one ground-based curved mirror. A processor can scale color values at the first and second color pixel locations of the tri-color background-subtracted image. The processor can form a single-color background-subtracted image from the scaled color values at the first color pixel locations, the scaled color values at the second color pixel locations, and third color values at the third color pixel locations. The single-color background-subtracted image can correspond to a point spread function or a line spread function of the optical system.

20 Claims, 6 Drawing Sheets

(52) U.S. Cl.
CPC ............. *H04N 5/374* (2013.01); *H04N 9/045* (2013.01); *H04N 2209/046* (2013.01)

(58) Field of Classification Search
CPC .. H04N 9/045; H04N 5/345; H04N 2209/046; G01J 1/4228; G01J 3/2803; G01J 1/08; G01J 3/28; G01J 1/0414; G01J 3/021; G01J 2003/1213; G01J 1/0488; G01J 5/08; G01J 1/02; G01J 5/0275; G01J 5/0846; G01J 5/0809; G01J 1/04; G01J 5/02; G01J 1/0242; G01J 5/522; G01J 2005/0077; G01J 2001/4266; G02B 5/1861

See application file for complete search history.

(56) References Cited

U.S. PATENT DOCUMENTS

| | | |
|---|---|---|
| 6,836,289 B2 | 12/2004 | Koshiba et al. |
| 7,002,627 B1 | 2/2006 | Raffy et al. |
| 8,158,929 B2 | 4/2012 | Schiller |
| 9,068,886 B2 | 6/2015 | Silny et al. |
| 2010/0032557 A1* | 2/2010 | Schiller ............... G02B 5/1861 250/252.1 |
| 2012/0292494 A1* | 11/2012 | Silny ...................... G01J 3/021 250/252.1 |
| 2013/0027553 A1* | 1/2013 | Silny ........................ G01J 1/08 348/144 |
| 2017/0205337 A1* | 7/2017 | Akhtman .............. G01J 3/2823 |
| 2019/0079004 A1* | 3/2019 | Ulanch ................. G01J 3/0272 |
| 2019/0258899 A1* | 8/2019 | Coogan .............. G06K 9/00657 |

OTHER PUBLICATIONS

Schiller, Stephen, et al., "The Specular Array Radiometric Calibration (SPARC) method: a new approach for absolute vicarious calibration in the solar reflective spectrum", Proc. of SPIE vol. 7813, (2010), 1-19.

* cited by examiner

SPATIAL RADIOMETRIC CORRECTION OF AN OPTICAL SYSTEM HAVING A COLOR FILTER MOSAIC

CROSS-REFERENCE TO RELATED APPLICATION

This application claims the benefit of U.S. Provisional Application No. 62/633,861, filed Feb. 22, 2018, which is hereby incorporated by reference in its entirety.

FIELD OF THE DISCLOSURE

The present disclosure relates generally to calibrating an optical system.

BACKGROUND OF THE DISCLOSURE

To calibrate an optical system, it can often be desirable to measure the system's point spread function and evaluate the system's spectral radiometric response to small targets. For optical systems that include a color filter mosaic disposed on an array of sensor pixels, it can be difficult to directly measure such a point spread function. If such a measurement uses signals from just red pixels, just green pixels, or just blue pixels on a multi-wavelength detector, the signals may include holes or gaps, due to the non-contiguous nature in which the red pixels, green pixels, or blue pixels are arranged on the detector. The result is to spatially undersample the scene content in each spectral band.

SUMMARY

An example of a method can include: positioning an optical system above a ground-based scene, the optical system including a color filter mosaic disposed on an array of sensor pixels, the color filter mosaic configured to determine first color pixel locations, second color pixel locations, and third color pixel locations in the array of sensor pixels; capturing a first tri-color image of the scene with the optical system, the first tri-color image including a reflection of sunlight from at least one ground-based curved mirror in the scene; capturing a second tri-color image of the scene with the optical system, the second tri-color image lacking the reflection of sunlight from the at least one ground-based curved mirror; with a processor, subtracting the second tri-color image from the first tri-color image to form a tri-color background-subtracted image; with the processor, scaling color values at the first and second color pixel locations of the tri-color background-subtracted image; and with the processor, forming a single-color background-subtracted image from the scaled color values at the first color pixel locations, the scaled color values at the second color pixel locations, and third color values at the third color pixel locations, the single-color background-subtracted image corresponding to a point-spread function of the optical system.

Another example of a method can include: positioning an optical system above a ground-based scene, the optical system including a color filter mosaic disposed on an array of sensor pixels, the color filter mosaic configured to determine red pixel locations, green pixel locations, and blue pixel locations in the array of sensor pixels, the red pixel locations, the green pixel locations, and the blue pixel locations being non-contiguous; capturing a first tri-color image of the scene with the optical system, the first tri-color image including a reflection of sunlight from at least one ground-based curved mirror in the scene; capturing a second tri-color image of the scene with the optical system, the second tri-color image lacking the reflection of sunlight from the at least one ground-based curved mirror; with a processor, subtracting the second tri-color image from the first tri-color image to form a tri-color background-subtracted image; with the processor, scaling color values at the red pixel locations of the tri-color background-subtracted image by multiplying the color values of the of the tri-color background-subtracted image by a specified red-to-green ratio, the red-to-green ratio being determined from a measured reflectivity spectrum of the at least one ground-based curved mirror, a transmission spectrum of the color filter mosaic at the red pixel locations, and a transmission spectrum of the color filter mosaic at the green pixel locations; with the processor, scaling color values at the blue pixel locations of the tri-color background-subtracted image by multiplying the color values of the of the tri-color background-subtracted image by a specified blue-to-green ratio, the blue-to-green ratio being determined from a measured reflectivity spectrum of the at least one ground-based curved mirror and a transmission spectrum of the color filter mosaic at the blue pixel locations, and the transmission spectrum of the color filter mosaic at the green pixel locations; and with the processor, forming a single-color background-subtracted image from the scaled color values at the red pixel locations, the scaled color values at the blue pixel locations, and color values at the green pixel locations, the single-color background-subtracted image corresponding to a point-spread function of the optical system.

Another example of a method can include: positioning an optical system above a ground-based scene, the optical system including a color filter mosaic disposed on an array of sensor pixels, the color filter mosaic configured to determine red pixel locations, green pixel locations, and blue pixel locations in the array of sensor pixels, the red pixel locations, the green pixel locations, and the blue pixel locations being non-contiguous; capturing a first tri-color image of the scene with the optical system, the first tri-color image including a reflection of sunlight from a plurality of ground-based curved mirrors positioned along a line in the scene; capturing a second tri-color image of the scene with the optical system, the second tri-color image lacking the reflection of sunlight from the plurality of ground-based curved mirrors; with a processor, subtracting the second tri-color image from the first tri-color image to form a tri-color background-subtracted image; with the processor, scaling color values at the red pixel locations of the tri-color background-subtracted image by multiplying the color values of the of the tri-color background-subtracted image by a specified red-to-green ratio, the red-to-green ratio being determined from a measured reflectivity spectrum of the plurality of ground-based curved mirrors, a transmission spectrum of the color filter mosaic at the red pixel locations, and a transmission spectrum of the color filter mosaic at the green pixel locations; with the processor, scaling color values at the blue pixel locations of the tri-color background-subtracted image by multiplying the color values of the of the tri-color background-subtracted image by a specified blue-to-green ratio, the blue-to-green ratio being determined from a measured reflectivity spectrum of the plurality of ground-based curved mirrors and a transmission spectrum of the color filter mosaic at the blue pixel locations, and the transmission spectrum of the color filter mosaic at the green pixel locations; and with the processor, forming a single-color background-subtracted image from the scaled color values at the red pixel locations, the scaled color values at the blue pixel locations, and color values at the green pixel locations, the single-color background-subtracted image corresponding to a line spread function of the optical system along a direction orthogonal to the line.

BRIEF DESCRIPTION OF THE DRAWINGS

Corresponding reference characters indicate corresponding parts throughout the several views. Elements in the drawings are not necessarily drawn to scale. The configurations shown in the drawings are merely examples, and should not be construed as limiting the scope of the invention in any manner.

DETAILED DESCRIPTION

Figure 1:
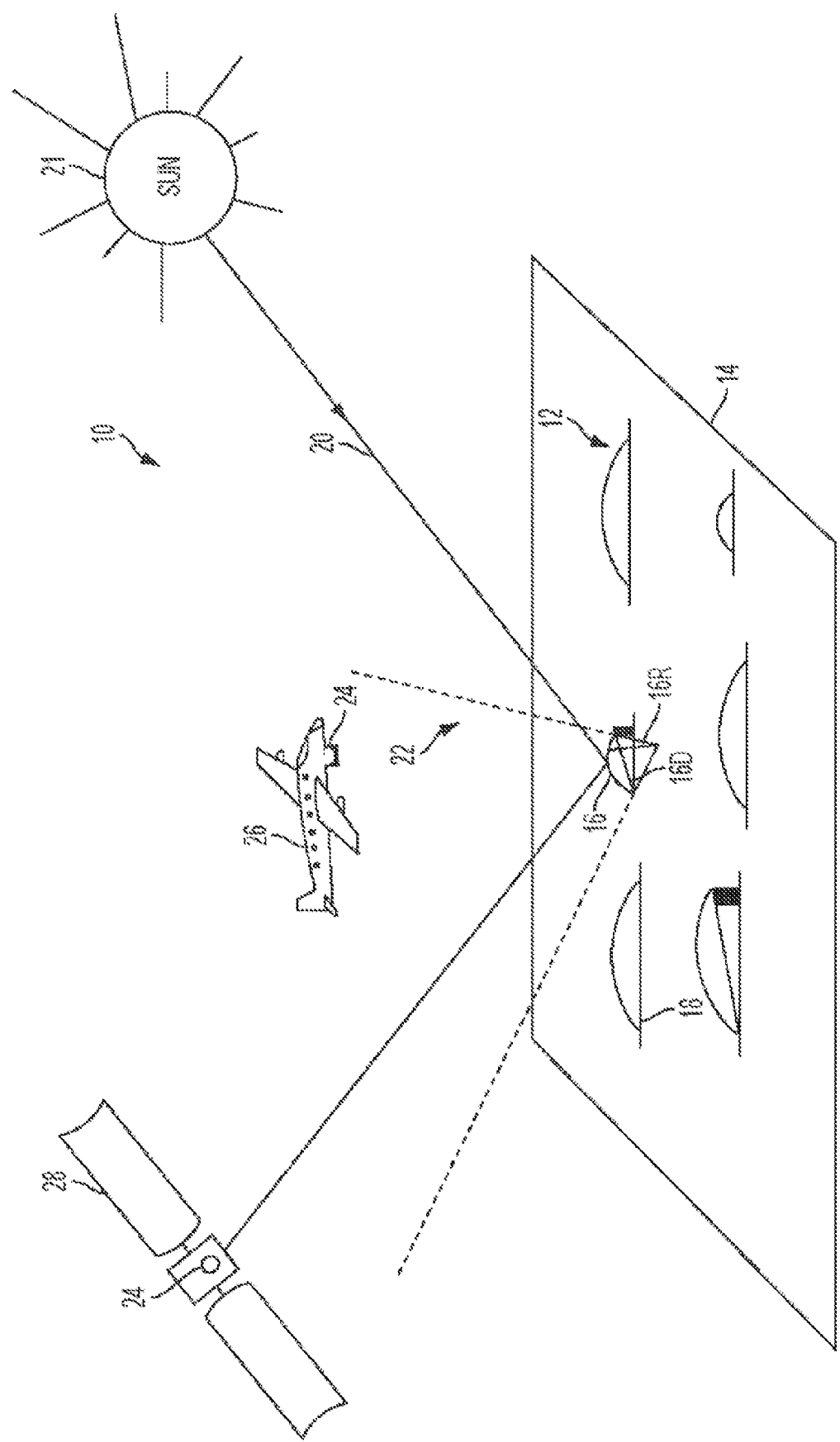
FIG. 1 shows a perspective view of an example of a vicarious spatial characterization system, in accordance with some embodiments.

To calibrate an optical imaging sensor system, one can measure a system detector response to a target of known radiance, irradiance or intensity. In some examples, the calibration target can be relatively small, and can form an image that extends over relatively few elements or pixels on the detector. For these small calibration targets, the calibration can further include directly measuring and correcting for spatial and spectral effects of the system's point spread function. Measuring a point spread function can determine how energy in each spectral band spreads spatially at an image of the target. Measurements are typically performed in detector digital numbers, which are dimensionless quantities that can be proportional to a detected energy at a particular detector pixel.

Some optical systems can include a color filter mosaic, such as a Bayer filter. The color filter mosaic can impart a color sensitivity to particular detector pixels, which can generate color images from a single detector, but can complicate measuring a point spread function. If a point spread function measurement uses the signal from just red pixels, just green pixels, or just blue pixels on a multi-wavelength detector focal plane, the signals may include holes or gaps, due to the non-contiguous nature in which the red pixels, green pixels, or blue pixels are arranged.

Accordingly, there exists a need to calibrate an optical system, which can fill those holes or gaps in a radiometrically correct manner, and can allow the target energy distribution to be represented as red, green and blue images of the calibration target at the full native detector resolution. Once the holes are filled, the total integrated DN response to the target in each spectral band can be processed, and radiometric calibration of the sensor can proceed.

In other words, the calibration can advantageously make use of the high-resolution spectrum of the reference target at the sensor, which is isolated because of background subtraction. The calibration can convert the single band pixel response to corresponding responses in other bands (such as tri-color). The conversion can fill in holes in the other bands. Because the holes can be filled, the calibration can calculate the integrated total energy (e.g., radiance) from the reference target. The calibration can calculate a calibration gain coefficient (e.g., digital number per unit radiance) from a ration of the total digital number response and the total integrated radiance.

As a specific example, in an optical system, a color filter mosaic can determine first color pixel locations, second color pixel locations, and third color pixel locations in an array of sensor pixels. The optical system can capture overhead images, which can be subtracted to form a background-subtracted tri-color image of a reflection of sunlight from at least one ground-based curved mirror. A processor can scale color values at the first and second color pixel locations of the tri-color background-subtracted image. The processor can form a single-color background-subtracted image, representing a spatial distribution of the target signal, from the scaled color values at the first color pixel locations, the scaled color values at the second color pixel locations, and third color values at the third color pixel locations. The single-color background-subtracted image can correspond to a point-spread function or a line spread function of the optical system. The single-color representation of the sensor response to the mirror target can be obtained without spatial interpolation from adjacent pixels, and can utilize the full resolution of the sensor pixel array, as explained below in more detail.

FIG. 1 shows a perspective view of a vicarious spatial characterization system 10, in accordance with some embodiments. Vicarious characterization means characterization of an image sensor after deployment of the image sensor to its operational environment, e.g., space using a calibration reference not onboard the sensor platform. The characterization system includes a target comprising a plurality of mirrors or reflectors 12 disposed upon background 14 so as to provide, for example, an array of reflective points upon the ground. Mirrors 12 can be configured to reflect the same amount of radiation or different amounts of radiation. Mirrors 12 can be convex, concave or flat reflectors. For example, mirrors 16 and 18 can be configured to reflect different intensity of directly incident sunlight 20 emanating from sun 21 due to a different radius of curvature. In one configuration, background 14 can be a substantially uniform surface on the earth surface with a relatively low reflectance, such as an asphalt pavement, a concrete area, a uniform grass patch, desert sand, sandy beach, and so forth. In another embodiment, background 14 can also be any other type of surface that can be provided on an aircraft, a satellite, or a surface of the moon, i.e., mirrors 12 can be placed on the moon, satellite, etc.

In some examples, mirrors 12 can have different radii of curvature. For example, mirror 16 has a radius of curvature 16R and a base dimension 16D. The radius of curvature 16R and the base dimension 16D provide field of regard (FOR) 22. Remote sensor 24 to be characterized may be provided, for example, on board aircraft 26 or satellite 28. When within the field of regard of one or more of mirrors 12, for example mirror 16, at least a pixel of sensor 24 receives light from one or more mirrors 12, for example mirror 16, as depicted in FIG. 1.

Mirrors 12 can have different radii of curvature and base dimensions, and as such different individual fields of regard. Each mirror 12 may be concave, convex, or flat. In the configuration shown in FIG. 1, each mirror 12 is convex. Any mirror 12, for example mirror 16, can be angled relative to background 14 to direct a cone of radiation (field-of-regard) emanating from sun 21 (the source of radiation) toward sensor 24. For example, this can be accomplished, by raising one side of mirror 16, such as via an adjustable or static structure.

In some examples, for which trial and error can be performed, the brightness of each mirror 12 can be tuned, if desired, so that the image of mirrors 12 on sensor 24 do not saturate (too bright) or starve (too dark). However, knowing the absolute amount of light reflected by each mirror is not required. The user may merely adjust the relative brightness of the mirrors so that that it is bright enough to be detected by sensor 24 but not too bright to saturate sensor 24.

In some examples, mirrors 12 can be positioned on surface 14 with a known spacing to form, for example, an array of mirrors. For example, the spacing or distance between mirrors 12 can be selected so as to be greater than a minimum dimension that can be resolved by sensor 24 so as to obtain distinct images of the mirrors on sensor 24. In some examples, the mirrors 12 can be separated by a distance greater than a radiometrically accurate instantaneous field of view of the sensor 24. In general, the absolute distance between mirrors 12 on surface 14 does not need to be known. Rather, it is sufficient to know that mirrors 12 are spaced far enough apart such that their images acquired by sensor 24 do not overlap. Likewise, it is sufficient to know mirrors 12 are not too far apart such that they are contained within a single image acquired by sensor 24.

Sensor or detector 24 can be placed on an airborne (e.g., aircraft) or space born platform (e.g., satellite). Sensor 24 can detect radiation in various wavelengths or wavelength ranges including the wavelength range between about 0.4 microns and about 15 microns which includes the visible range (between about 0.4 microns and about 0.7 microns), the near infrared range (between about 0.7 microns and about 1.4 microns), the short wavelength infrared (SWIR) range (between about 1.4 microns and about 3 microns), the mid-wavelength infrared (MWIR) range (between about 3 microns and about 8 microns) and at least a portion of the long-wavelength infrared (LWIR) range (between about 8 microns and about 15 microns). However, sensor or detector 24 can also be configured to detect in the ultraviolet wavelength range or even in the millimeter range or radiofrequency range if desired. In some examples, the sensor can be selected to work with the solar reflective spectrum, which extends from 0.3 microns to 6 microns.

Figure 2:
FIG. 2 shows an example of an aerial or spatial image captured by a remote image sensor, in accordance with some embodiments.
Figure 3:
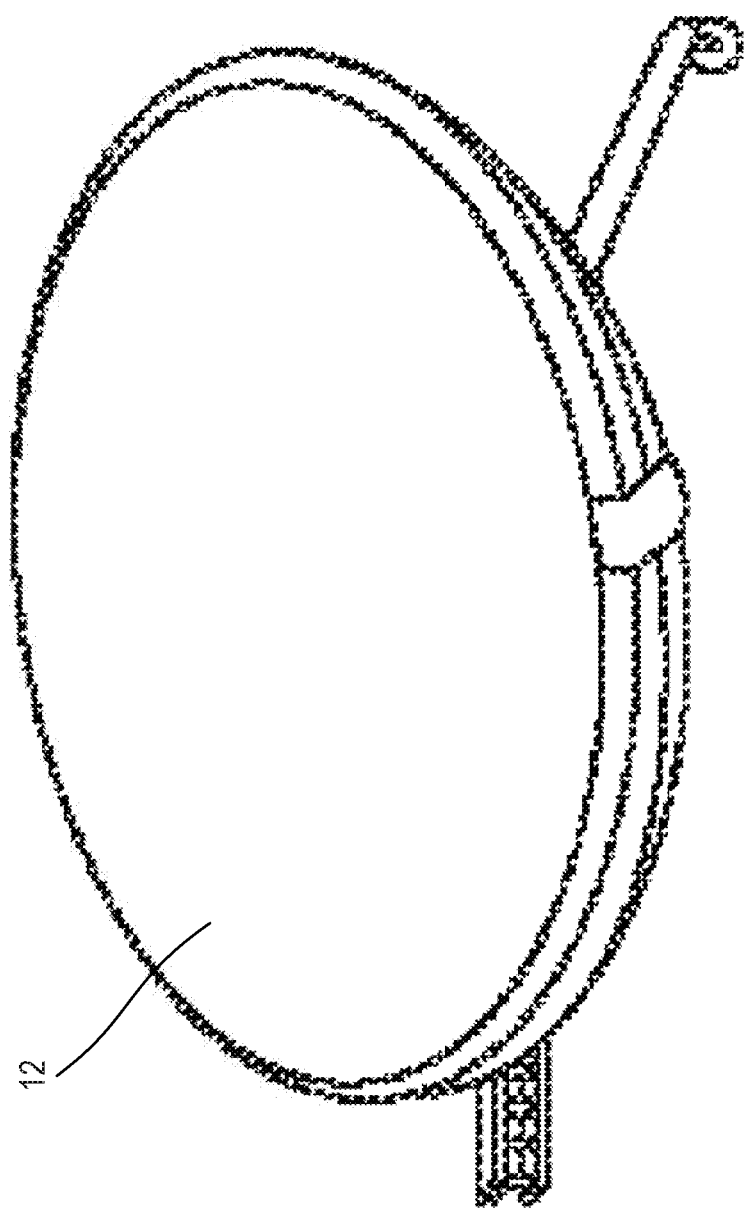
FIG. 3 shows an example of a mirror mounted on a structure and oriented generally toward the remote sensor, in accordance with some embodiments.

FIG. 2 shows an aerial or spatial image 30 captured by remote image sensor 24 of area 32 (e.g., in this case an empty parking lot) where mirrors 12 are positioned, in accordance with some embodiments. As shown in FIG. 2, in one embodiment, mirrors 12 are spaced apart to form an array. However, the mirrors do not need to be placed in a specific array with absolute known spacing, but can be arbitrarily laid out as long as mirrors 12 are spaced far enough apart such that their images are distinct and separate. The absolute position of each mirror 12 in area 32 may not be needed for the characterization of the sensor 24. FIG. 3 shows an example of a mirror 12 mounted on a structure and oriented generally toward sensor 24, in accordance with some embodiments.

As depicted in FIG. 2, each mirror 12 reflects radiation towards sensor 24 and the image of each mirror 12 appears as a distinct point image target or spot within the captured or acquired imaged data. In one embodiment, the size of each spot within the image can be about the size of one pixel of sensor 24. In some instances, the spot may be captured by a single pixel. However, in other instances, the spot may be captured by more than one pixel, for example two or more pixels, in which case, for example, a pixel in the plurality of pixels may contain only a portion of the spot. Additionally, if sensor 24 is experiencing an anomaly, or simply out of focus, the spots may be large and blurry. As a result, a sharpness of the image or the spatial resolution of the image may be affected. In order to quantify the image sharpness or spatial resolution, the image can be analyzed by an algorithm that can optimally co-register the spots (i.e., the image of the different mirror targets) to provide an oversampling of the two-dimensional system point spread function of remote sensor 24. The two-dimensional (2-D) spatial characteristics or performance of remote sensor 24 can be extracted from the optimally registered system point spread function. For example, the effects of optical aberrations in the optics used in remote sensor 24 or defects in the image sensor itself (e.g., charge coupled device CCD or focal plane array FPA) in remote sensor 24 can be quantified.

In the examples considered below, the optics in the remote sensor 24 can include a color filter mosaic, which can impart a color sensitivity to each sensor pixel. An example of a color filter mosaic is discussed below, followed by a discussion of how such a color filter mosaic can create problems for measuring a point spread function of the optics.

Figure 4:
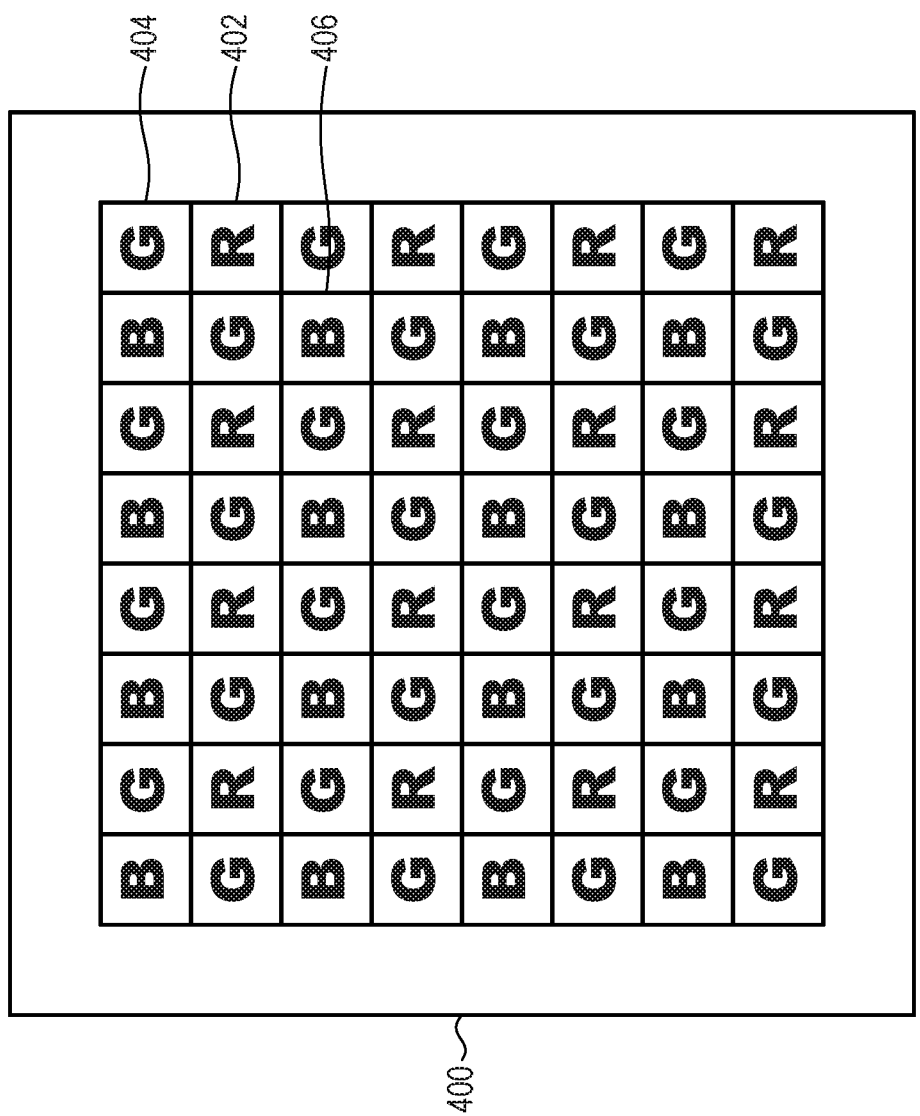
FIG. 4 shows an example of a color filter mosaic, in accordance with some embodiments.

FIG. 4 shows an example of a color filter mosaic 400, in accordance with some embodiments. Such a color filter mosaic 400 can be used with a multi-pixel sensor to capture color images (e.g., images having color values or intensity values for three or more colors). The configuration of FIG. 4 is but one example of a color filter mosaic; other suitable configurations can also be used.

The color filter mosaic 400 can include areas arranged in a grid, with each area being configured to transmit light in one of several specified wavelength ranges. When positioned adjacent to a multi-pixel sensor that has its pixels arranged in a one-to-one correspondence with the grid areas, the color filter mosaic 100 can direct light in a single wavelength range to the corresponding pixel in the sensor. For example, in the configuration of FIG. 4, the areas are configured to transmit light in one of a red wavelength range (denoted by "R" in FIG. 4), a green wavelength range ("G"), or a blue wavelength range ("B"). In this manner, when disposed on an array of sensor pixels, the color filter mosaic 400 can determine red pixel locations 402, green pixel locations 404, and blue pixel locations 406 in the array of sensor pixels. One specific example of a color filter mosaic is known as a Bayer filter. The arrangement of FIG. 4 is but one example; the colors may be arranged in other suitable patterns, and/or other suitable colors can be used (e.g., colors of cyan, yellow, green, and magenta, colors of red, green, blue, and emerald, or other combinations).

While the color filter mosaic 400 can advantageously impart color sensitivity to a color-insensitive array of sensor pixels, using the color filter mosaic 400 can create problems when attempting to measure very small features in the recorded images. More specifically, the color filter mosaic 400 can impede directly measuring a point spread function of the optical system, because the pixels for each wavelength range are non-contiguous. The images produced by the pixels of a single color may not have the full resolution of the full sensor array. For example, for the color filter mosaic 400 of FIG. 4, the spatial sampling of the green pixels is one-half of the resolution of the full sensor array, and the spatial sampling of the red or blue pixels is one-fourth of the resolution of the full sensor array. In most applications, one can compensate for the reduced resolution by interpolating color values from adjacent pixels or from adjacent neighborhoods of pixels. However, interpolation may be inadequate or undesirable for applications that require relatively high resolution, such as measuring a point spread function of the optical system, because interpolation could potentially smear out desired details in the images, and create uncertainties in the target signal recorded by the sensor.

In some applications, calibrating an optical system can require measuring a two-dimensional point spread function of the optical system. Measuring the point spread function can involve capturing an image of a relatively small object, such as a point source of light, or a reflection from a mirror that is smaller than the optical system can resolve. If the optical system is well-corrected for aberrations (e.g., diffraction-limited), the point spread function can include a central lobe with a particular diameter, or, if the optical system is anamorphic, different diameters along two orthogonal directions. For well-corrected systems, the point spread function can also include alternating bright and dark rings of decreasing intensity surrounding the central lobe. In high-performance optical systems, the central lobe of the point spread function can extend across just a single pixel, or across a relatively small number of pixels. Measuring a point spread function at a particular wavelength or wavelength range, which would involve using color values from just one of the filter colors (such as red, green, or blue), would be problematic, because the color values would have "holes" of missing data between the non-contiguous pixels. Interpolating from adjacent pixels to fill in the missing values would also be problematic, because such interpolation would likely smear out the fine detail of the point spread function.

Figure 5:
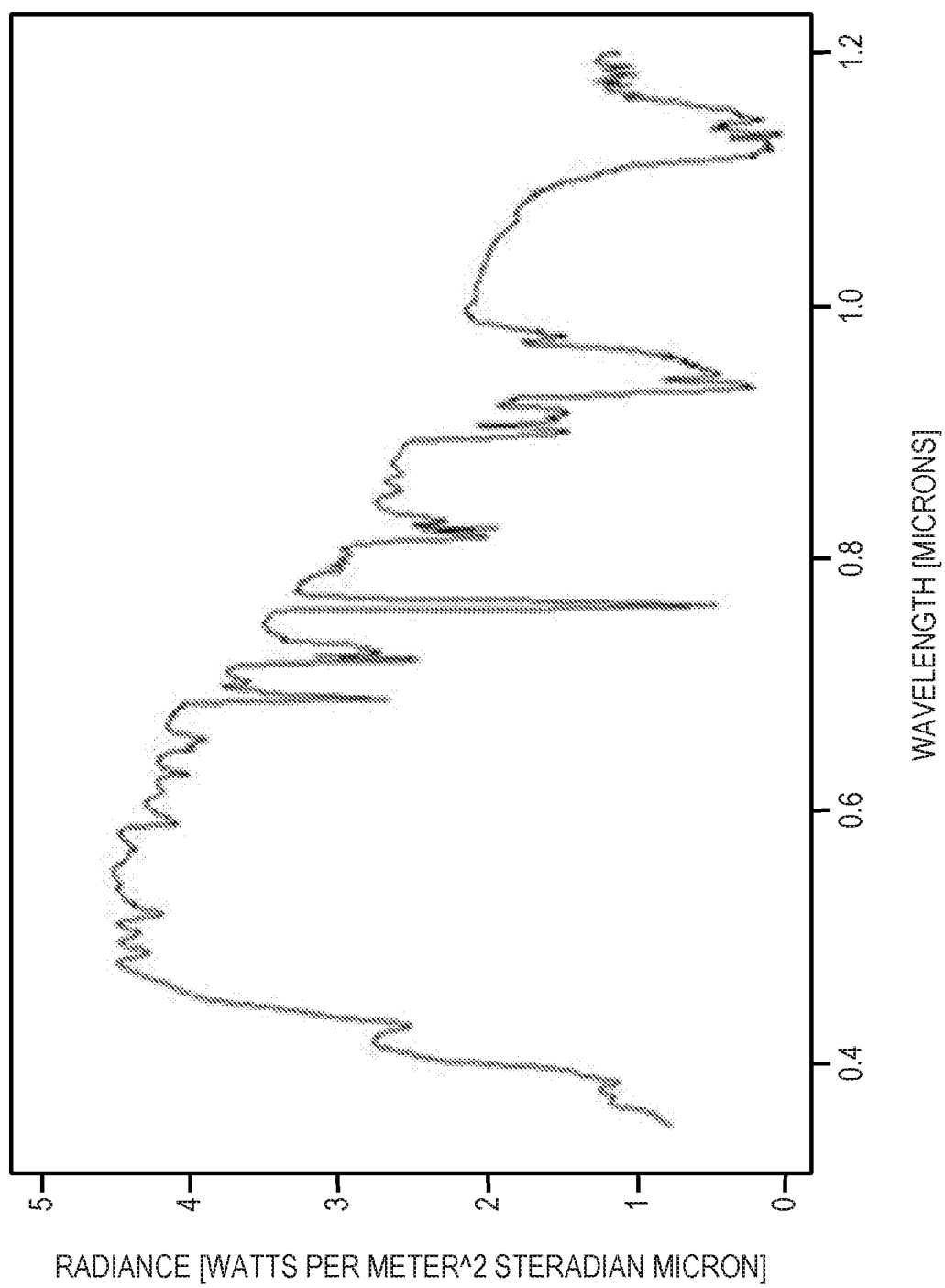
FIG. 5 shows an example of the reflected at-sensor radiance spectrum from a second-surface mirror, in accordance with some embodiments.

To address these issues, the methods discussed below can measure the system's point spread function, without having to interpolate from adjacent pixels. One can capture an image of a reflection of sunlight, reflected from a mirror with a well-measured reflectance spectrum and atmospheric transmittance spectrum. FIG. 5 shows an example of an at-sensor effective radiance spectrum from a second-surface mirror, in accordance with some embodiments. In general, the measured reflectance spectrum can have very fine resolution as a function of wavelength, which is the horizontal axis is the plot of FIG. 5. In FIG. 5, the measured quantity is radiance, which can have radiometric units of watts per square meter steradian micron. Other suitable radiometric quantities can also be used. One can use ratios derived from the well-determined radiance spectrum to scale measured color values from red pixels to green pixels, and to scale measured color values from blue pixels to green pixels. The scaled values of the red and blue pixels can mesh with measured color values from green pixels to form a single-color representation of the reflection of sunlight. The single-color representation can have the full resolution of the sensor pixel array.

Mathematically, the at-sensor radiance spectrum can be fully described by the following equation:

$$L_{at\text{-}sensor}(\lambda, \theta_r) = \rho(\lambda, \theta_r)\tau\downarrow(\lambda)\tau\uparrow(\lambda)E_0(\lambda)\left(\frac{R}{2GSD}\right)^2$$

Quantity $L_{at\text{-}sensor}(\lambda,\theta_r)$ is the at-sensor radiance, in watts per meter squared per steradian per micron per mirror. Quantity $\rho(\lambda,\theta_r)$ is a specular reflectance of the mirror, and in some cases is assumed to be invariant with respect to angle of reflectance $\theta_r$. Quantity $\tau_\downarrow(\lambda)$ is a sun-to-ground transmittance. Quantity $\tau_\uparrow(\lambda)$ is a ground-to-sensor transmittance. Quantity $E_0(\lambda)$ is the solar spectral constant. Quantity R is a radius of curvature of the mirror, in meters. Quantity GSD, the ground sample distance, is a line-of-sight diameter of a pixel projected on the ground, in meters.

Figure 6:
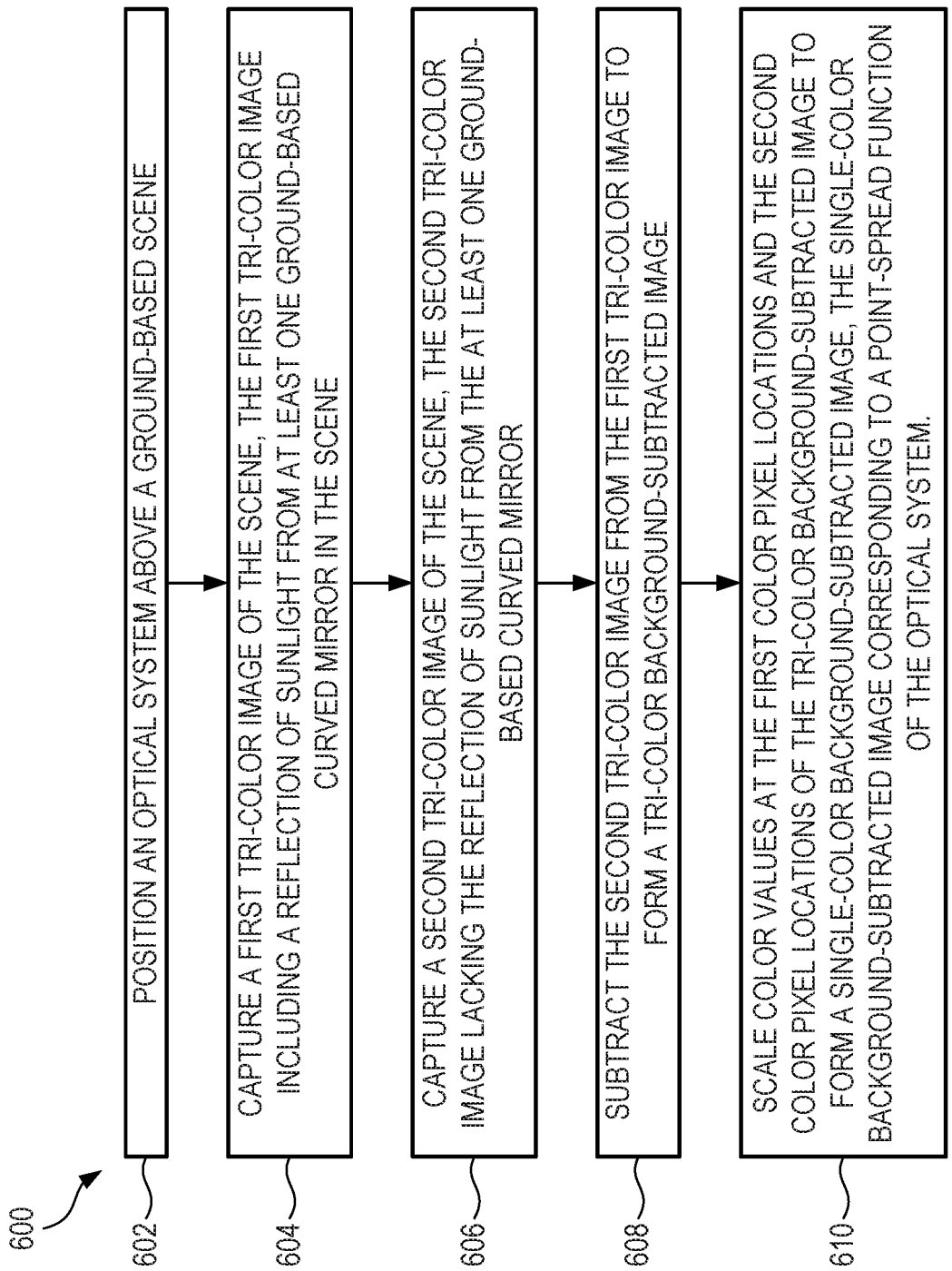
FIG. 6 shows a flowchart of an example of a method for calibrating an optical system, in accordance with some embodiments.

FIG. 6 shows a flowchart of an example of a method 600 for calibrating an optical system, in accordance with some embodiments. The method can be executed on the spatial characterization system 10 of FIG. 1, or on other suitable optical systems. The method 600 of FIG. 6 is but one method for calibrating an optical system; other suitable methods can also be used.

At operation 602, an optical system can be positioned above a ground-based scene. In some examples, the optical system can be mounted in a location that can be difficult to access, such as flown in an aircraft, or attached to a satellite. An advantage of the method 600 is that the method 600 can be performed without directly accessing or manipulating the optical system itself. This advantage can be referred to as vicariousness.

The optical system can include a color filter mosaic disposed on an array of sensor pixels. The color filter mosaic can determine first color pixel locations, second color pixel locations, and third color pixel locations in the array of sensor pixels. In some examples, the first, second, and third color pixels locations can be red pixel locations, blue pixel locations, and green pixel locations. In some examples, the first, second, and third colors can be any combination of red, green, and blue in any suitable order. It will be understood that other wavelength ranges can also be used, including ultraviolet, infrared, and so forth. The optical system can further include one or more lenses and/or mirrors that can form an image of the ground-based scene on the array of sensor pixels. The optical system can optionally further include one or more mirrors that can redirect light toward the lens, from the lens to the array of sensor pixels, or along a desired optical path within a housing.

At operation 604, the optical system can capture a first tri-color image of the scene. The first tri-color image can include a reflection of sunlight from at least one ground-based curved mirror in the scene. The ground-based curved mirror can be the mirror 12 shown in FIGS. 1-3 or another suitable mirror. The sun and the atmosphere, together, produce the at-surface illumination of the scene. Both the sun and the atmosphere have been studied extensively, so that sunlight has a well-documented spectrum (e.g., intensity, radiance, emittance, or other suitable unit of brightness, as a function of wavelength). The curved mirror can be measured in a controlled setting, such as in a laboratory setting before the mirror is installed in the ground-based scene. Such measurements can produce an at-sensor radiance spectrum with a relatively high spectral resolution (e.g., with relatively fine increments in wavelength). As a result, the reflected sunlight reaching the sensor's entrance pupil when located within the mirror's field of regard can have a radiance spectrum that is known accurately, a priori, without relying on any images captured by the optical system.

In order to isolate the reflected sunlight from the calibration target (specifically, the total energy spectrum in the reflected sunlight), it is desirable to subtract out the background image (e.g., the portion of the image that is not the reflected sunlight by the target). Because the pixel area of the ground-based mirror(s) is negligible compared to the much larger area of the ground-based scene that contains the mirror(s), one can assume that the sensor point spread function can spread the energy of the background over adjacent pixels at or near the mirror(s). As a result, one can assume that the average color value response to the background around the mirror(s) contributes equally to the signal within the pixels that include the mirror(s). Consequently, background subtraction can extract the response to just the target spectrum alone. Note that the quantity involved is not just a spectrum but is a total energy spectrum over a total spatial extent of the mirror(s) in the captured image(s).

To capture a background image, at operation 606, the optical system can capture a second tri-color image of the scene. The second tri-color image can lack the reflection of sunlight from the at least one ground-based curved mirror. In some examples, the at least one ground-based curved mirror can be uncovered and/or repositioned to achieve reflection for the first tri-color image positioning the sensor within the mirror's field of regard. In some examples, the at least one ground-based curved mirror can be covered and/or repositioned to block reflection for the second tri-color image, positioning the sensor outside the mirror's field of regard. In some examples, the first and second tri-color images can be captured relatively quickly, so that the view of the ground-based scene does not change significantly with respect to the aircraft or satellite that houses the optical system. In another example, the mirror can be placed on uniform background that extends well beyond the extent of the mirror image. As a result, the background can be measured from the pixel values in the uniform area outside the image of the mirror and subtracted from the pixel values containing the mirror image to produce a background subtracted image of the mirror. This does not require a second image for the background subtraction.

At operation 608, a processor can subtract the second tri-color image from the first tri-color image to form a tri-color background-subtracted image. In some examples, the processor can account for color values in manner that maintains zero or positive color values in the tri-color background-subtracted image. In some examples, the tri-color background-subtracted image can include just the sunlight reflected from the at least one ground-based curved mirror, to within reasonable tolerances of detection and calculation noise. In some example, subtracting the background in this manner should also account for atmospheric influence on the spectrum, so that the reflected sunlight in the tri-color background-subtracted image includes only the spectra of sunlight reflected from the curved mirror, which is well-documented.

The mirror, and more specifically the location from which the sunlight appears to emerge, is relatively small, compared to the field of view of the optical system. As a result, this location can smaller than the resolution limit of the optical system, and the emergent sunlight can function as a point source for the optical system. Consequently, the sunlight arriving at the sensor pixel can be a physical representation of a point spread function of the optical system. A size of the sunlight spot at the detector can provide a numerical value or values of the point spread function, which can be useful for calibrating the optical system.

As explained above, the color filter mosaic can cause three images to be captured by the array of sensor pixels. Because the first color pixel locations can be non-contiguous, the second color pixel locations can be non-contiguous, and the third color pixel locations can be non-contiguous, the three single-color images can each include holes, which occur because the pixels in these single-color images are non-contiguous. Rather than interpolate from adjacent pixels to use color values of the same color, the method 600 can use color values of different colors to fill in the holes because the spectrum produced by the mirror target is known.

At operation 610, a processor can scale color values at the first color pixel locations and the second color pixel locations of the tri-color background-subtracted image to form a single-color background-subtracted image. For example, the method 600 can scale the measured color value of a red pixel upward or downward, to mesh with the color values of adjacent green pixels. The scaling is determined in a manner that uses the accurately-determined spectra of the sunlight, the mirror(s), and the red, green, or blue filters in the color filter mosaic. The scaling is discussed in detail below. The single-color background-subtracted image can correspond to a point spread function of the optical system. The single-color background-subtracted image can also extend across pixel locations that are contiguous, and thereby use a full resolution of the array of sensor pixels.

In some examples, scaling the color values at the red pixel locations can include multiplying the color values of the of the tri-color background-subtracted image by a specified red-to-green ratio. The red-to-green ratio can be determined from a measured reflectivity spectrum of the at least one ground-based curved mirror and a transmission spectrum of the color filter mosaic at the red pixel locations.

Similarly, in some examples, scaling the color values at the blue pixel locations can include multiplying the color values of the of the tri-color background-subtracted image by a specified blue-to-green ratio. The blue-to-green ratio can be determined from the measured reflectivity spectrum of the at least one ground-based curved mirror and a transmission spectrum of the color filter mosaic at the blue pixel locations.

In some examples, one can measure a reflectivity of the at least one ground-based curved mirror, as a function of wavelength, to form the measured reflectivity spectrum. In some examples, a processor can integrate the measured reflectivity spectrum with the transmission spectrum of the color filter mosaic at the red pixel locations, over wavelength, to form a red radiance quantity. Similarly, the processor can integrate the measured reflectivity spectrum with the transmission spectrum of the color filter mosaic at the green pixel locations, over wavelength, to form a green radiance quantity. Further, the processor can integrate the measured reflectivity spectrum with the transmission spectrum of the color filter mosaic at the blue pixel locations, over wavelength, to form a blue radiance quantity. The processor can calculate the red-to-green ratio as a ratio of the red radiance quantity to the green radiance quantity. The processor can calculate the blue-to-green ratio as a ratio of the blue radiance quantity to the green radiance quantity.

The red-to-green ratio and the blue-to-green ratio are discussed in detail below. It will be understood that the terms "red", "green", and "blue" are used only for convenience, and may be replaced with any suitable names for the color bands of the color filter mosaic, such as "first", "second", and "third", and so forth. The techniques discussed herein apply equally well to color bands that are not visually perceived as red, green, or blue, or lie outside the visible spectrum.

The reflectance spectrum of the ground-based mirror or mirrors can be measured accurately, with a relatively fine resolution as a function of wavelength. Sunlight, transmitted from the sun to the ground target and from the target to the sensor, also has a known spectrum, also with a relatively fine resolution as a function of wavelength. As a result of these two quantities being known, the total energy (radiance or intensity) in the reflected sunlight at the sensor is therefore known, along with the mirror radius of curvature and the sensor ground sample distance, also with a relatively fine resolution as a function of wavelength. Therefore, a processor or other computing device can integrate the at-sensor spectrum with the spectral response function of each band, to calculate total energy band relative quantities for the red, green, and blue bands, in response to the reflected sunlight from the ground-based mirror(s). These total energy band relative quantities can be divided to form radiance ratios. For example, the total energy band relative quantities for the red and green bands can be divided to form a red-to-green ratio, the total energy band relative quantities for the blue and green bands can be divided to form a blue-to-green ratio, and so forth. These ratios are the predicted at-sensor absolute band ratios at the time at which the optical system is over the ground-based mirror(s).

In some examples, the first tri-color image can include a reflection of sunlight from a single ground-based curved mirror in the scene. In some examples, the single-color background-subtracted image can correspond to a two-dimensional point spread function of the optical system.

As an alternative, the first tri-color image can include a reflection of sunlight from a plurality of ground-based curved mirrors in the scene. The mirrors can be positioned in any suitable arrangement in the scene. In some examples, the plurality of ground-based curved mirrors can be positioned along a line. In some examples, for mirrors positioned along a line, and a Bayer mask positioned in front of the sensor, the mask and sensor can be positioned such that an image of the mirrors can extend along a row and/or column of alternating red/green and blue/green pixels. For these examples, after background subtraction, on can directly obtain the scaling ratios by comparing color values along the line. Although it is possible to obtain the scaling ratios from any large extended uniform area, obtaining the ratios from a line image can have two potential advantages. First, over a larger area, MTF effects are averaged out and may not represent the scaling ratios for small targets. Second, the spectral match can be maintained relative to line targets used as the calibration references since the line center can be accurately located to subpixel accuracy and is common to all spectral bands.

One can thus calculate gain ratios that can transform a red pixel color value to at green pixel color value at the red pixel location, and a blue pixel color value to a green pixel color value at the blue pixel location. The response of a red detector can therefore be transformed to what the corresponding green response would be at that red pixel location, for any pixel in the image of a suitable target. Likewise, the response of a blue detector can therefore be transformed to what the corresponding green response would be at that blue pixel location, for any pixel in the image of a suitable target. One can therefore form a green band image, for example, of a SPARC calibration target with the full spatial resolution of the focal plane without any interpolation between pixels.

There may be instances when multiple mirror targets, or line targets, can be preferable to single-mirror targets, or point targets. Such instances correspond to a particular set of values for a quantity Q. Quantity Q is defined as a wavelength, times an f/# of the optical system, divided by a detector pitch. For cases in which the quantity Q is relatively small, such as being less than 0.5, the resolution of the system can be pixel-limited, and the background-subtracted image of the target can be obtained as described above, for point targets (single mirrors), multiple mirror targets, or line targets (multiple mirrors arranged along a line). For cases in which the quantity Q is relatively large, such as being greater than 0.5, the resolution of the system can be diffraction-limited. For diffraction-limited systems, the size of the point spread function blur spot depends on the wavelength; this is not the case for pixel-limited systems. For example, a red blur spot can be larger than a blue blur spot, for a diffraction-limited system. For these diffraction-limited cases, using a line target can be preferable, so that more pixels can be illuminated, compared with using a point target. In addition, the center of the line is the same for each color, and can therefore be determined with a full resolution of the focal plane. One can include a spatial adjustment in the spectral scaling factor, relative to the line center to account for the wavelength dependent effects of diffraction.

Although the inventive concept has been described in detail for the purpose of illustration based on various embodiments, it is to be understood that such detail is solely for that purpose and that the inventive concept is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

Furthermore, since numerous modifications and changes will readily occur to those with skill in the art, it is not desired to limit the inventive concept to the exact construction and operation described herein. Accordingly, all suitable modifications and equivalents should be considered as falling within the spirit and scope of the present disclosure.

STATEMENT OF INDUSTRIAL APPLICABILITY

This disclosure has application in sensor characterization, particularly vicarious spatial characterization of remote image sensors.

EXAMPLES

To further illustrate the device and related method disclosed herein, a non-limiting list of examples is provided below. Each of the following non-limiting examples can stand on its own, or can be combined in any permutation or combination with any one or more of the other examples.

In Example 1, a method for calibrating an optical system can include: positioning the optical system above a ground-based scene, the optical system including a color filter mosaic disposed on an array of sensor pixels, the color filter mosaic configured to determine first color pixel locations, second color pixel locations, and third color pixel locations in the array of sensor pixels; capturing a first tri-color image of the scene with the optical system, the first tri-color image including a reflection of sunlight from at least one ground-based curved mirror in the scene; capturing a second tri-color image of the scene with the optical system, the second tri-color image lacking the reflection of sunlight from the at least one ground-based curved mirror; with a processor, subtracting the second tri-color image from the first tri-color image to form a tri-color background-subtracted image; with the processor, scaling color values at the first and second color pixel locations of the tri-color background-subtracted image; and with the processor, forming a single-color background-subtracted image from the scaled color values at the first color pixel locations, the scaled color values at the second color pixel locations, and third color values at the third color pixel locations, the single-color background-subtracted image corresponding to a point spread function of the optical system.

In Example 2, the method of Example 1 can optionally be configured such that: the first color pixel locations are red pixel locations; the second color pixel locations are blue pixel locations; and the third color pixel locations are green pixel locations.

In Example 3, the method of any one of Examples 1-2 can optionally be configured such that: the red pixel locations are non-contiguous; the green pixel locations are non-contiguous; the blue pixel locations are non-contiguous; and the single-color background-subtracted image extends across pixel locations that are contiguous.

In Example 4, the method of any one of Examples 1-3 can optionally be configured such that the single-color background-subtracted image is formed without using interpolation from adjacent pixels.

In Example 5, the method of any one of Examples 1-4 can optionally be configured such that: scaling the color values at the red pixel locations comprises multiplying the color values of the of the tri-color background-subtracted image by a specified red-to-green ratio, the red-to-green ratio being determined from a measured reflectivity spectrum of the at least one ground-based curved mirror, a transmission spectrum of the color filter mosaic at the red pixel locations, and a transmission spectrum of the color filter mosaic at the green pixel locations; and scaling the color values at the blue pixel locations comprises multiplying the color values of the of the tri-color background-subtracted image by a specified blue-to-green ratio, the blue-to-green ratio being determined from the measured reflectivity spectrum of the at least one ground-based curved mirror, a transmission spectrum of the color filter mosaic at the blue pixel locations, and the transmission spectrum of the color filter mosaic at the green pixel locations.

In Example 6, the method of any one of Examples 1-5 can optionally further include: measuring a reflectivity of the at least one ground-based curved mirror, as a function of wavelength, to form the measured reflectivity spectrum; integrating the measured reflectivity spectrum with the transmission spectrum of the color filter mosaic at the red pixel locations, over wavelength, to form a red radiance quantity; integrating the measured reflectivity spectrum with the transmission spectrum of the color filter mosaic at the green pixel locations, over wavelength, to form a green radiance quantity; integrating the measured reflectivity spectrum with the transmission spectrum of the color filter mosaic at the blue pixel locations, over wavelength, to form a blue radiance quantity; calculating the red-to-green ratio as a ratio of the red radiance quantity to the green radiance quantity; and calculating the blue-to-green ratio as a ratio of the blue radiance quantity to the green radiance quantity.

In Example 7, the method of any one of Examples 1-6 can optionally be configured such that: the first tri-color image includes a reflection of sunlight from a single ground-based curved mirror in the scene; and the single-color background-subtracted image corresponds to a two-dimensional point spread function of the optical system.

In Example 8, the method of any one of Examples 1-7 can optionally be configured such that the first tri-color image includes a reflection of sunlight from a plurality of ground-based curved mirrors in the scene.

In Example 9, the method of any one of Examples 1-8 can optionally be configured such that the plurality of ground-based curved mirrors are positioned along a line.

In Example 10, the method of any one of Examples 1-9 can optionally further include, prior to capturing the first tri-color image of the scene with the optical system: aligning the optical system such that the plurality of ground-based curved mirrors are imaged onto a line of sensor pixels in the array of sensor pixels.

In Example 11, the method of any one of Examples 1-10 can optionally be configured such that the single-color background-subtracted image corresponds to one-dimensional point spread function of the optical system, along a dimension orthogonal to the line.

In Example 12, the method of any one of Examples 1-11 can optionally further include, prior to capturing the first tri-color image of the scene with the optical system: uncovering the at least one ground-based curved mirror.

In Example 13, the method of any one of Examples 1-12 can optionally further include, prior to capturing the first tri-color image of the scene with the optical system: repositioning the at least one ground-based curved mirror.

In Example 14, the method of any one of Examples 1-13 can optionally further include, prior to capturing the second tri-color image of the scene with the optical system: covering the at least one ground-based curved mirror.

In Example 15, the method of any one of Examples 1-14 can optionally further include, prior to capturing the second tri-color image of the scene with the optical system: repositioning the at least one ground-based curved mirror.

In Example 16, a method for calibrating an optical system can include: positioning the optical system above a ground-based scene, the optical system including a color filter mosaic disposed on an array of sensor pixels, the color filter mosaic configured to determine red pixel locations, green pixel locations, and blue pixel locations in the array of sensor pixels, the red pixel locations, the green pixel locations, and the blue pixel locations being non-contiguous; capturing a first tri-color image of the scene with the optical system, the first tri-color image including a reflection of sunlight from at least one ground-based curved mirror in the scene; capturing a second tri-color image of the scene with the optical system, the second tri-color image lacking the reflection of sunlight from the at least one ground-based curved mirror; with a processor, subtracting the second tri-color image from the first tri-color image to form a tri-color background-subtracted image; with the processor, scaling color values at the red pixel locations of the tri-color background-subtracted image by multiplying the color values of the of the tri-color background-subtracted image by a specified red-to-green ratio, the red-to-green ratio being determined from a measured reflectivity spectrum of the at least one ground-based curved mirror, a transmission spectrum of the color filter mosaic at the red pixel locations, and a transmission spectrum of the color filter mosaic at the green pixel locations; with the processor, scaling color values at the blue pixel locations of the tri-color background-subtracted image by multiplying the color values of the of the tri-color background-subtracted image by a specified blue-to-green ratio, the blue-to-green ratio being determined from a measured reflectivity spectrum of the at least one ground-based curved mirror and a transmission spectrum of the color filter mosaic at the blue pixel locations, and the transmission spectrum of the color filter mosaic at the green pixel locations; and with the processor, forming a single-color background-subtracted image from the scaled color values at the red pixel locations, the scaled color values at the blue pixel locations, and color values at the green pixel locations, the single-color background-subtracted image corresponding to a point spread function of the optical system.

In Example 17, the method of Example 16 can optionally be configured such that the single-color background-subtracted image is formed without using interpolation from adjacent pixels.

In Example 18, the method of any one of Examples 16-17 can optionally be configured such that the first tri-color image includes a reflection of sunlight from a plurality of ground-based curved mirrors positioned along a line in the scene.

In Example 19, the method of any one of Examples 16-18 can optionally further include, prior to capturing the first tri-color image of the scene with the optical system: aligning the optical system such that the plurality of ground-based curved mirrors are imaged onto a line of sensor pixels in the array of sensor pixels.

In Example 20, a method for calibrating an optical system can include: positioning the optical system above a ground-based scene, the optical system including a color filter mosaic disposed on an array of sensor pixels, the color filter mosaic configured to determine red pixel locations, green pixel locations, and blue pixel locations in the array of sensor pixels, the red pixel locations, the green pixel locations, and the blue pixel locations being non-contiguous; capturing a first tri-color image of the scene with the optical system, the first tri-color image including a reflection of sunlight from a plurality of ground-based curved mirrors positioned along a line in the scene; capturing a second tri-color image of the scene with the optical system, the second tri-color image lacking the reflection of sunlight from the plurality of ground-based curved mirrors; with a processor, subtracting the second tri-color image from the first tri-color image to form a tri-color background-subtracted image; with the processor, scaling color values at the red pixel locations of the tri-color background-subtracted image by multiplying the color values of the of the tri-color background-subtracted image by a specified red-to-green ratio, the red-to-green ratio being determined from a measured reflectivity spectrum of the plurality of ground-based curved mirrors, a transmission spectrum of the color filter mosaic at the red pixel locations, and a transmission spectrum of the color filter mosaic at the green pixel locations; with the processor, scaling color values at the blue pixel locations of the tri-color background-subtracted image by multiplying the color values of the of the tri-color background-subtracted image by a specified blue-to-green ratio, the blue-to-green ratio being determined from a measured reflectivity spectrum of the plurality of ground-based curved mirrors and a transmission spectrum of the color filter mosaic at the blue pixel locations, and the transmission spectrum of the color filter mosaic at the green pixel locations; and with the processor, forming a single-color background-subtracted image from the scaled color values at the red pixel locations, the scaled color values at the blue pixel locations, and color values at the green pixel locations, the single-color background-subtracted image corresponding to a line spread function of the optical system along a direction orthogonal to the line.

What is claimed is:

1. A method for calibrating an optical system, the method comprising:
positioning the optical system above a ground-based scene, the optical system including a color filter mosaic disposed on an array of sensor pixels, the color filter mosaic configured to determine first color pixel locations, second color pixel locations, and third color pixel locations in the array of sensor pixels;
capturing a first tri-color image of the scene with the optical system, the first tri-color image including a reflection of sunlight from at least one ground-based curved mirror in the scene;
capturing a second tri-color image of the scene with the optical system, the second tri-color image lacking the reflection of sunlight from the at least one ground-based curved mirror;
with a processor, subtracting the second tri-color image from the first tri-color image to form a tri-color background-subtracted image;
with the processor, scaling color values at the first and second color pixel locations of the tri-color background-subtracted image; and
with the processor, forming a single-color background-subtracted image from the scaled color values at the first color pixel locations, the scaled color values at the second color pixel locations, and third color values at the third color pixel locations, the single-color background-subtracted image corresponding to a point spread function of the optical system.

2. The method of claim 1, wherein:
the first color pixel locations are red pixel locations;
the second color pixel locations are blue pixel locations; and
the third color pixel locations are green pixel locations.

3. The method of claim 2, wherein:
the red pixel locations are non-contiguous;
the green pixel locations are non-contiguous;
the blue pixel locations are non-contiguous; and
the single-color background-subtracted image extends across pixel locations that are contiguous.

4. The method of claim 2, wherein the single-color background-subtracted image is formed without using interpolation from adjacent pixels.

5. The method of claim 2, wherein:
scaling the color values at the red pixel locations comprises multiplying the color values of the of the tri-color background-subtracted image by a specified red-to-green ratio, the red-to-green ratio being determined from a measured reflectivity spectrum of the at least one ground-based curved mirror, a transmission spectrum of the color filter mosaic at the red pixel locations, and a transmission spectrum of the color filter mosaic at the green pixel locations; and
scaling the color values at the blue pixel locations comprises multiplying the color values of the of the tri-color background-subtracted image by a specified blue-to-green ratio, the blue-to-green ratio being determined from the measured reflectivity spectrum of the at least one ground-based curved mirror, a transmission spectrum of the color filter mosaic at the blue pixel locations, and the transmission spectrum of the color filter mosaic at the green pixel locations.

6. The method of claim 5, further comprising:
measuring a reflectivity of the at least one ground-based curved mirror, as a function of wavelength, to form the measured reflectivity spectrum;
integrating the measured reflectivity spectrum with the transmission spectrum of the color filter mosaic at the red pixel locations, over wavelength, to form a red radiance quantity;

integrating the measured reflectivity spectrum with the transmission spectrum of the color filter mosaic at the green pixel locations, over wavelength, to form a green radiance quantity;

integrating the measured reflectivity spectrum with the transmission spectrum of the color filter mosaic at the blue pixel locations, over wavelength, to form a blue radiance quantity;

calculating the red-to-green ratio as a ratio of the red radiance quantity to the green radiance quantity; and calculating the blue-to-green ratio as a ratio of the blue radiance quantity to the green radiance quantity.

7. The method of claim 1, wherein:
the first tri-color image includes a reflection of sunlight from a single ground-based curved mirror in the scene; and
the single-color background-subtracted image corresponds to a two-dimensional point spread function of the optical system.

8. The method of claim 1, wherein the first tri-color image includes a reflection of sunlight from a plurality of ground-based curved mirrors in the scene.

9. The method of claim 8, wherein the plurality of ground-based curved mirrors are positioned along a line.

10. The method of claim 9, further comprising, prior to capturing the first tri-color image of the scene with the optical system:
aligning the optical system such that the plurality of ground-based curved mirrors are imaged onto a line of sensor pixels in the array of sensor pixels.

11. The method of claim 10, wherein the single-color background-subtracted image corresponds to one-dimensional point spread function of the optical system, along a dimension orthogonal to the line.

12. The method of claim 1, further comprising, prior to capturing the first tri-color image of the scene with the optical system:
uncovering the at least one ground-based curved mirror.

13. The method of claim 1, further comprising, prior to capturing the first tri-color image of the scene with the optical system:
repositioning the at least one ground-based curved mirror.

14. The method of claim 1, further comprising, prior to capturing the second tri-color image of the scene with the optical system:
covering the at least one ground-based curved mirror.

15. The method of claim 1, further comprising, prior to capturing the second tri-color image of the scene with the optical system:
repositioning the at least one ground-based curved mirror.

16. A method for calibrating an optical system, the method comprising:
positioning the optical system above a ground-based scene, the optical system including a color filter mosaic disposed on an array of sensor pixels, the color filter mosaic configured to determine red pixel locations, green pixel locations, and blue pixel locations in the array of sensor pixels, the red pixel locations, the green pixel locations, and the blue pixel locations being non-contiguous;
capturing a first tri-color image of the scene with the optical system, the first tri-color image including a reflection of sunlight from at least one ground-based curved mirror in the scene;
capturing a second tri-color image of the scene with the optical system, the second tri-color image lacking the reflection of sunlight from the at least one ground-based curved mirror;
with a processor, subtracting the second tri-color image from the first tri-color image to form a tri-color background-subtracted image;
with the processor, scaling color values at the red pixel locations of the tri-color background-subtracted image by multiplying the color values of the of the tri-color background-subtracted image by a specified red-to-green ratio, the red-to-green ratio being determined from a measured reflectivity spectrum of the at least one ground-based curved mirror, a transmission spectrum of the color filter mosaic at the red pixel locations, and a transmission spectrum of the color filter mosaic at the green pixel locations;
with the processor, scaling color values at the blue pixel locations of the tri-color background-subtracted image by multiplying the color values of the of the tri-color background-subtracted image by a specified blue-to-green ratio, the blue-to-green ratio being determined from a measured reflectivity spectrum of the at least one ground-based curved mirror and a transmission spectrum of the color filter mosaic at the blue pixel locations, and the transmission spectrum of the color filter mosaic at the green pixel locations; and
with the processor, forming a single-color background-subtracted image from the scaled color values at the red pixel locations, the scaled color values at the blue pixel locations, and color values at the green pixel locations, the single-color background-subtracted image corresponding to a point spread function of the optical system.

17. The method of claim 16, wherein the single-color background-subtracted image is formed without using interpolation from adjacent pixels.

18. The method of claim 16, wherein the first tri-color image includes a reflection of sunlight from a plurality of ground-based curved mirrors positioned along a line in the scene.

19. The method of claim 18, further comprising, prior to capturing the first tri-color image of the scene with the optical system:
aligning the optical system such that the plurality of ground-based curved mirrors are imaged onto a line of sensor pixels in the array of sensor pixels.

20. A method for calibrating an optical system, the method comprising:
positioning the optical system above a ground-based scene, the optical system including a color filter mosaic disposed on an array of sensor pixels, the color filter mosaic configured to determine red pixel locations, green pixel locations, and blue pixel locations in the array of sensor pixels, the red pixel locations, the green pixel locations, and the blue pixel locations being non-contiguous;
capturing a first tri-color image of the scene with the optical system, the first tri-color image including a reflection of sunlight from a plurality of ground-based curved mirrors positioned along a line in the scene;
capturing a second tri-color image of the scene with the optical system, the second tri-color image lacking the reflection of sunlight from the plurality of ground-based curved mirrors;

with a processor, subtracting the second tri-color image from the first tri-color image to form a tri-color background-subtracted image;

with the processor, scaling color values at the red pixel locations of the tri-color background-subtracted image by multiplying the color values of the of the tri-color background-subtracted image by a specified red-to-green ratio, the red-to-green ratio being determined from a measured reflectivity spectrum of the plurality of ground-based curved mirrors, a transmission spectrum of the color filter mosaic at the red pixel locations, and a transmission spectrum of the color filter mosaic at the green pixel locations;

with the processor, scaling color values at the blue pixel locations of the tri-color background-subtracted image by multiplying the color values of the of the tri-color background-subtracted image by a specified blue-to-green ratio, the blue-to-green ratio being determined from a measured reflectivity spectrum of the plurality of ground-based curved mirrors and a transmission spectrum of the color filter mosaic at the blue pixel locations, and the transmission spectrum of the color filter mosaic at the green pixel locations; and with the processor, forming a single-color background-subtracted image from the scaled color values at the red pixel locations, the scaled color values at the blue pixel locations, and color values at the green pixel locations, the single-color background-subtracted image corresponding to a line spread function of the optical system along a direction orthogonal to the line.

* * * * *

UNITED STATES PATENT AND TRADEMARK OFFICE
CERTIFICATE OF CORRECTION

PATENT NO. : 10,692,178 B2
APPLICATION NO. : 16/281977
DATED : June 23, 2020
INVENTOR(S) : Stephen J. Schiller Page 1 of 1

It is certified that error appears in the above-identified patent and that said Letters Patent is hereby corrected as shown below:

In the Specification

Column 6, Line 39, delete "100" and insert --400-- therefor

Signed and Sealed this
Fifth Day of January, 2021

Andrei Iancu
*Director of the United States Patent and Trademark Office*